United States Patent [19]

Moench et al.

[11] Patent Number: 4,981,913
[45] Date of Patent: Jan. 1, 1991

[54] BRIDGED, WATER-SOLUBLE COPOLYMERS, THEIR PREPARATION AND THEIR USE

[75] Inventors: Dietmar Moench, Weinheim; Andreas Stange, Mannheim; Joerg Liebe, Frankenthal; Heinrich Hartman, Limburgerhof; Franz Merger, Frankenthal; Manfred Schwartz, Ludwigshafen, all of Fed. Rep. of Germany

[73] Assignee: BASF Aktiengesellschaft, Ludwigshafen, Fed. Rep. of Germany

[21] Appl. No.: 409,747

[22] Filed: Sep. 20, 1989

[30] Foreign Application Priority Data

Oct. 10, 1988 [DE] Fed. Rep. of Germany ....... 3834435

[51] Int. Cl.$^5$ .............................................. C08F 8/12
[52] U.S. Cl. .............................. 515/327.2; 525/328.2; 525/340; 525/383
[58] Field of Search ................. 525/327.2, 328.2, 340, 525/383

[56] References Cited

U.S. PATENT DOCUMENTS 3,556,932 1/1971 Coscia et al.
4,605,718 8/1986 Jansma et al.

Primary Examiner—Bernard Lipman
Attorney, Agent, or Firm—Oblon, Spivak, McClelland, Maier & Neustadt

[57] ABSTRACT

Bridged, water-soluble copolymers are obtainable by
(A) copolymerization of a monomer mixture of
  (a) from 50 to 99 mol % of acrylamide and/or methacrylamide,
  (b) from 50 to 1 mol % of a monoethylenically unsaturated monomer containing actual groups and
  (c) from 0 to 20 mol % of monomers which differ from (a) and (b),
  in the presence of a polymerization initiator under conditions such that the acetal groups of the monomers (b) undergo virtually no hydrolysis,
(B) hydrolysis of the acetal groups of the monomers (b), present as copolymerized units in the copolymers (A),
(C) condensation of the copolymers (B) containing aldehyde groups at a pH above 5, at most to a degree such that the resulting condensates are still water-soluble and
(D) stopping of the condensation reaction by adding acid until the pH reaches 3 or less,
and are used as paper stock additives in papermaking for increasing the wet strength of paper.

10 Claims, No Drawings

BRIDGED, WATER-SOLUBLE COPOLYMERS, THEIR PREPARATION AND THEIR USE

U.S. Pat. No. 3,556,932 discloses that cationically modified polyacrylamides activated with glyoxal are suitable as wet-strength agents in papermaking. The starting polymer is partially bridged as a result of the reaction with glyoxal. During storage of the polymers which have been reacted with glyoxal, it is found that, in addition to a deterioration in the efficiency as a wet-strength agent, the polymer solutions are attacked by fungi.

German Laid-Open application No. DOS 2,757,206 discloses polymers which contain, as copolymerized units, monoethylenically unsaturated monomers containing acetal groups. Because of their content of amidoacetal groups, these polymers can be easily modified and are used, for example, for the production of moldings, coatings or adhesives.

U.S. Pat. No. 4,605,781 discloses water-soluble polymers which contain, as copolymerized units, not less than 2 mol % of a monomer containing acetal groups. As also described in the said patent, these polymers which are hydrolyzed by the action of hydrochloric acid and contain aldehyde groups are suitable wet-strength agents in papermaking. However, the shelf life of the hydrolyzed products is unsatisfactory because crosslinked products form. Moreover, the efficiency of the hydrolyzed products as wet-strength agents is unsatisfactory.

It is an object of the present invention to provide water-soluble copolymers which, when used as wet-strength agents in papermaking, have improved efficiency and shelf life compared with known copolymers containing aldehyde groups.

We have found that this object is achieved, according to the invention, by bridged, water-soluble copolymers which are obtainable by (A) copolymerization of a monomer mixture of
  (a) from 50 to 99 mol % of acrylamide and/or methacrylamide,
  (b) from 50 to 1 mol % of a monoethylenically unsaturated monomer containing acetal groups and
  (c) from 0 to 20 mol % of monomers which differ from (a) and (b),
  the sum of the mol %ages (a) to (c) always being 100, in the presence of a polymerization initiator under conditions such that the acetal groups of monomer (b) undergo virtually no hydrolysis, to give a copolymer having a K value of from 10 to 70,
(B) hydrolysis of the acetal groups of monomer (b), present as copolymerized units in the copolymers (A), to aldehyde groups at a pH below 5,
(C) condensation of copolymer (B) containing aldehyde groups at a pH above 5 to at most a degree such that the resulting condensates are still water-soluble and
(D) stopping the condensation reaction by adding acid until the pH reaches 3 or less.

The copolymers obtainable in this manner have a long shelf life and are used as pulp additives in papermaking, in order to increase the wet strength of paper.

The bridged, water-soluble copolymers are prepared in a multistage process. In process stage (A), the copolymers are first prepared by copolymerization of the monomers (a), (b) and, if required, (c). Acrylamide, methacrylamide or a mixture of acrylamide and methacrylamide in any ratio is used as monomers of group (a). The amount of these monomers in the monomer mixture which is copolymerized is from 50 to 99, preferably from 70 to 90, mol %.

Monoethylenically unsaturated compounds containing acetal groups are used as monomers of group (b). Examples of suitable compounds for this purpose are described in German Laid-Open application No. DOS 2,757,206 and U.S. Pat. No. 4,605,718. These are, for example, compounds of the general formula

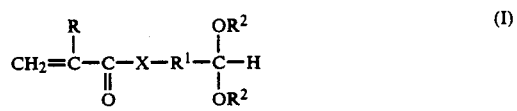

where R is H, $CH_3$, $C_2H_5$, X is O or NH, $R^1$ is $C_1$-$C_8$-alkylene or arylene and $R^2$ is $C_1$-$C_4$-alkyl or both radicals $R^2$ form a $C_2$-$C_4$-alkylene group.

Examples of suitable compounds are the following:

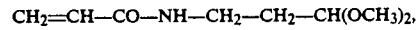

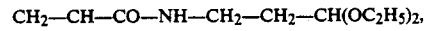

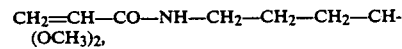

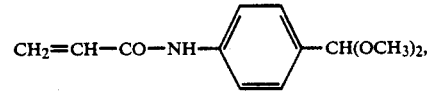

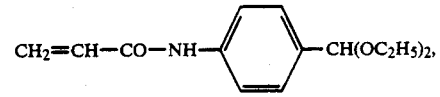

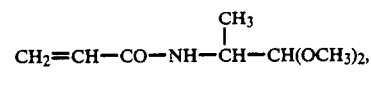

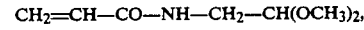

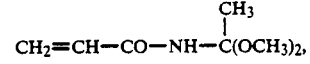

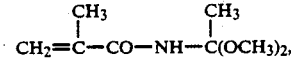

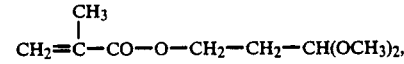

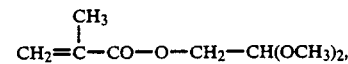

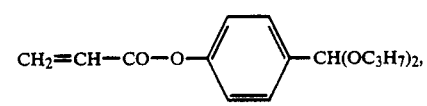

-continued

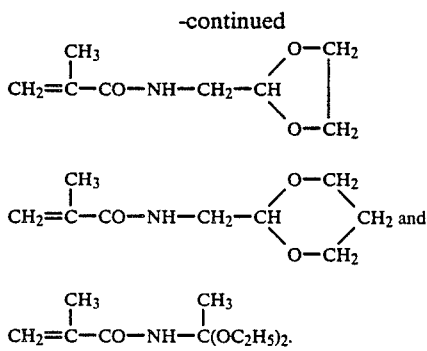

Monomers of the formula

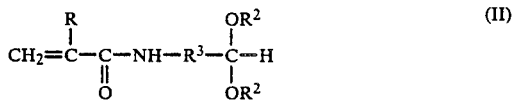

where R is H, CH₃ or C₂H₅, R³ is C₂-C₄-alkylene and R² is C₁-C₄-alkyl or both radicals R² form a C₂-C₄-alkylene group, are preferably used.

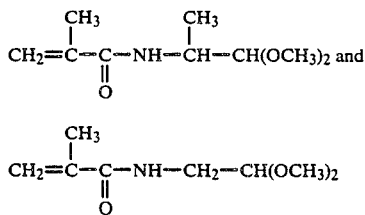

are particularly suitable suitable monomers of (b).

In the copolymerization, the monomers of group (b) are used in an amount of from 50 to 1, preferably from 25 to 5, mol % in the monomer mixture. It is of course also possible to use different monomers containing acetal groups, of the formula (I), in the copolymerization with the monomers (a) and, if required, the monomer (c).

Examples of suitable monomers of group (c) are compounds of the formulae

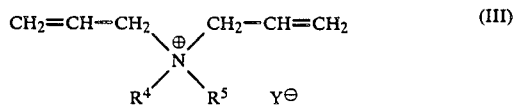

where $R^4$ and $R^5$ are each $C_1$-$C_{10}$-alkyl and Y is Cl, Br, methosulfate and ethosulfate, and

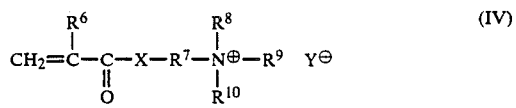

where $R^6$ is H, CH₃ or C₂H₅, X is O or NR⁶, R⁷ is C₁-C₆-alkylene, R⁸, R⁹ and R¹⁰ are each H, CH₃, C₂H₅ or (CH₂—CH₂—O)$_n$—H, n is from 1 to 6 and Y is Cl, Br, I, sulfate, methosulfate or ethosulfate.

Of the compounds of group (c), diallyldimethylammonium chloride and methacrylamidopropyltrimethylammonium chloride are preferably used. If the monomers of group (c) are used in the copolymerization, they are present in amounts of not more than 20, preferably from 2 to 15, mol % in the monomer mixtures. The preparation of terpolymers of (a) acrylamide, (b) (1,1-dimethoxyprop-2-yl)-methacrylamide or (1,1-dimethoxyeth-2-yl)-methacrylamide and (c) diallyldimethylammonium chloride or methacrylamidopropyltrimethylammonium chloride is preferred.

The copolymerization of the monomers (a), (b) and, if required, (c) is carried out in aqueous solution in the presence of a polymerization initiator which decomposes into free radicals under the polymerization conditions. Examples of suitable polymerization initiators are hydrogen peroxide, alkali metal and ammonium salts of peroxysulfuric acid, peroxides, hydroperoxides, redox catalysts and free radical azo compounds. Water-soluble azo compounds, e.g. 2,2'-azobis-(N,N'-dimethyleneisobutyramidine)dihydrochloride, 2,2'-azobis-(2-amidinopropa dihydrochloride or 2,2'-azobis-[2-methyl-N-(2-hydroxyethyl)-propionamide], are particularly suitable.

The polymerization initiators are used in the conventional amounts, for example from 0.5 to 5.0% by weight, based on the monomers to be polymerized. The polymerization can be carried out in a wide temperature range, under reduced, atmospheric or superatmospheric pressure. The polymerization is preferably carried out at not more than 100° C., in particular from 70 to 100° C. It may be effected in the presence or absence of polymerization regulators. Examples of suitable polymerization regulators are alcohols, such as methanol, ethanol, n-propanol and isopropanol, and ketones, such as acetone and methyl ethyl ketone. Hydroxylammonium salts, such as hydroxylammonium sulfate, and chlorohydrocarbons or thio compounds, such as thioglycollic acid, dodecylmercaptan or 2-mercaptoethanol, can also be used as polymerization regulators. The regulators are employed in amounts of from 0.001 to 60, preferably from 1 to 40, % by weight, based on the monomers used. Weak regulators, such as alcohols, are used in a larger amount than the thio compounds, which have a particularly powerful effect as regulators. The concentration of the monomers in the reaction mixture is chosen so that the resulting polymer solutions have a solids content of from 1 to 60, preferably from 10 to 30, % by weight. The copolymerization is carried out under conditions such that the acetal groups of the monomers (b) undergo virtually no hydrolysis. This requirement is met by adjusting the pH of the reaction mixture to 6–10, preferably 7–9, and keeping it at this value.

In process step (B), the aqueous copolymer solutions are brought to a pH below 5, so that the acetal groups of the monomers (b) present as copolymerized units in the copolymers (A) are hydrolyzed to aldehyde groups. Not less than 30%, preferably from 70 to 100%, of the copolymers (A) containing acetal groups are hydrolyzed. Hydrolysis is carried out by adding an acid, e.g. hydrochloric acid, hydrobromic acid, sulfuric acid, phosphoric acid or formic acid, to the copolymer solution obtained in (A). Hydrolysis is effected at from 20 to 100° C., preferably from 30 to 60° C. Otherwise, it is carried out as described in U.S. Pat. No. 4,605,718. The viscosity of 20% strength by weight solutions of the hydrolyzed copolymers is from not less than 5 to 200, preferably from 5 to 25, mPa.s at 22° C.

In process step (C), the copolymers (B) containing aldehyde groups and obtained in process step (B) are condensed, at a pH from above 5 to about 11, at most to a degree such that water-soluble polymers are still obtained. Examples of suitable bases are sodium hydroxide solution, potassium hydroxide solution, ammonia and amines, e.g. triethylamine, triethanolamine, morpholine and ethanolamine. The pH of the reaction solution is preferably kept at 7-9 during the condensation reaction (C). The temperature of the aqueous solution during the condensation is from 20 to 80° C., preferably from 30 to 50° C. The polymer content of the aqueous solution during the condensation reaction (C) is advantageously from 10 to 50, preferably from 15 to 25, % by weight. The condensation reaction can be monitored from the increase in the viscosity of the reaction mixture. 20% strength by weight aqueous polymer solutions which are obtained in process step (B) have viscosities of from 5 to 200 mPa.s [(measured using a rotational viscometer (Contraves Rheomat 15 T) at 22° C. and 152 rpm); the measured pH is 2]. The viscosity of such an aqueous solution is increased by a (C) condensation to 20–1000 mPa.s (measure on a 20% strength by weight aqueous polymer solution at 22° C). The condensation gives bridged, water-soluble polymers which are presumably formed by reaction of acrylamide groups of one chain with aldehyde groups of another chain of the copolymer, in accordance with the following scheme:

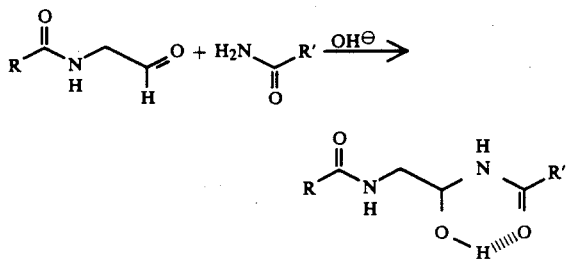

R and R' are each a polymer chain. This reaction cannot be reversed by adding an acid but can be stopped in this manner. The aqueous solutions obtained in process step (C) preferably have a viscosity of from 20 to 200 mPa.s at 22° C. and at a polymer content of 20% by weight, aqueous copolymer solutions having a viscosity of from 25 to 50 mPa.s (determined on 20% strength by weight aqueous polymer solutions at 22° C.) having a particularly long shelf life. The viscosity of the aqueous copolymer solutions obtained according to (C) (20% by weight/22° C.) is not less than 5, preferably more than 10, mPa.s greater than that of the aqueous copolymer solutions obtained in process step (B), likewise measured at 20% by weight copolymer content and 22° C.

The condensation reaction in which bridged, water-soluble copolymers are formed is stopped in step (D) by adding an acid. The pH of the solution is brought to 3 or lower. For example, a mineral acid is added in an amount such that the reaction solution has a pH of from 0 to 3, preferably from 1 to 2. Examples of suitable acids for stopping the reaction are hydrochloric acid, hydrobromic acid, sulfuric acid, phosphoric acid and formic acid.

The solutions of bridged copolymers obtained in this manner can be added directly to the pulp in papermaking to increase the wet strength of paper. From 0.01 to 10, preferably from 0.09 to 2, % by weight, based on dry fiber, of bridged copolymers are used. Surprisingly, when the bridged copolymers are used in papermaking, the paper grades obtained have a higher wet strength than when the same amount of aldehyde-containing copolymers, which are disclosed in U.S. Pat. No. 4,605,718, are used. Moreover, the novel bridged copolymers in aqueous solution have a substantially improved shelf life compared with the prior art aldehyde-containing copolymers.

The K value of the copolymers obtained in process step (A) is from 10 to 70, preferably from 15 to 40.

The K value of the copolymers was measured according to H. Fikentscher, Cellulosechemie, 13 (1932), 58–64 and 71–74, in aqueous solution at 25° C., at a polymer concentration of 1% by weight and at a pH of 8; $K = k \cdot 10^3$. All viscosity data are based on measurements on 20% strength by weight aqueous copolymer solutions at 22° C. using a rotational viscometer (Contraves Rheomat 15 T) at 152 rpm.

EXAMPLE 1

(A) Preparation of a terpolymer of 75 mol % of acrylamide, 20 mol % of (1,1-dimethoxyprop-2-yl)-methacrylamide and 5 mol % of diallyldimethylammonium chloride In a 2 l flask provided with a stirrer, a thermometer, a gas inlet tube and a reflux condenser, 61 g of a 66% strength by weight aqueous solution of diallyldimethylammonium chloride, 300 g of water, 70 g of isopropanol and 0.4 g of sodium diethylenetriaminepentaacetate are initially taken and are heated to 90° C. while simultaneously stirring and passing in nitrogen. As soon as the temperature of the initially taken mixture has reached 90° C., a solution of 532.5 g of a 50% strength by weight aqueous acrylamide solution, 173 g of (1,1-dimethoxyprop-2-yl)-methacrylamide and 70 g of isopropanol is added in the course of 2.5 hours and, separately from this but starting at the same time, a solution of 18 g of 2,2'-azobis-(2-amidinopropane) dihydrochloride is introduced in the course of 4.5 hours. After the addition of the initiator, the reaction mixture is stirred for a further hour at 90° C. Thereafter, 6 g of 2,2'-azobis-(2-amidinopropane) dihydrochloride, dissolved in 125 g of water, are added in the course of 1 hour, and, after the end of the addition, the reaction mixture is left for a further hour at 90° C. to undergo complete polymerization. All feeds and the initially taken mixture are brought to pH 8 with 10% strength by weight sodium hydroxide solution before being used. Thereafter, 450 g of an isopropanol/water mixture is distilled off. An aqueous copolymer solution whose hydrogenation iodine number is 0.1 is obtained. The K value of the copolymer is 26.

(B) Hydrolysis of the acetal groups of the copolymer

In a 500 ml glass flask provided with a stirrer, a thermometer and a reflux condenser, 8 g of 10% strength by weight hydrochloric acid are added to 220 g of the 36% strength by weight copolymer solution obtained in (A), and the reaction mixture is stirred for 6 hours at 50° C. After this time, virtually all acetal groups have been hydrolyzed.

(C) Condensation of the aldehyde-containing copolymers according to (B)

In a 2 l glass flask provided with a stirrer, a thermometer and a reflux condenser, 220 g of the 35% strength by weight solution of the hydrolyzed copolymer according to (B) and 185 g of a buffer solution (10 g of disodium hydrogen phosphate and 175 g of water) are initially taken and 12.5 g of a 10% strength aqueous sodium hydroxide solution are added, in order to bring the reaction mixture to a pH of 8. The mixture is heated to 35° C. Before the addition of the sodium hydroxide solution, the viscosity of a 21% strength by weight solution was 10 mPa.s. After the reaction mixture has been kept at pH 8 and 35° C. for 40 minutes, the condensation reaction is stopped by adding 43 g of 10% strength hydrochloric acid in process step.

(D) Afterwards the reaction mixture had a pH of 2. The viscosity of a 20% strength aqueous solution, after cooling to 22° C., is 30 mPa.s.

EXAMPLES 2 TO 5

The terpolymers shown in Table 1 are first prepared in step (4) by a method similar to that described in Example 1.

TABLE 1

| Example No. | Process step (A) Polymerization of ... mol % Monomer at pH = 8 | K value of the copolymer | (B) Hydrolysis Addition of ... g of 10% strength HCl | pH | Viscosity [mPa · s] |
|---|---|---|---|---|---|
| 2 | (a) 80 acrylamide<br>(b) 10 (1,1-dimethoxyprop-2-yl)-methacrylamide and<br>(c) 10 diallyldimethylammonium chloride | 28 | 8 | 2 | 6 |
| 3 | (a) 85 acrylamide<br>(b) 10 (1,1-dimethoxyprop-2-yl)-methacrylamide and<br>(c) 5 diallyldimethylammonium chloride | 27 | 8 | 2 | 7 |
| 4 | (a) 85 acrylamide<br>(b) 10 (1,1-dimethoxyprop-2-yl)-methacrylamide and<br>(c) 5 methacrylamidopropyltrimethyl-ammonium chloride | 24 | 8 | 2 | 6 |
| 5 | (a) 75 acrylamide<br>(b) 20 (1,1-dimethoxyeth-2-yl)-methacrylamide and<br>(c) 5 diallyldimethylammonium chloride | 33 | 8 | 2 | 5 |

| Example No. | (C) Condensation by the addition of 10% strength NaOH pH | (D) Stopping of the reaction by the addition of 10% strength HCl pH | Solids content of reaction solution (D) after the addition of acid | Viscosity [mPa · s] |
|---|---|---|---|---|
| 2 | 8 | 1.8 | 20.0 | 27 |
| 3 | 8 | 1.5 | 20.0 | 34 |
| 4 | 8 | 1.9 | 20.0 | 30 |
| 5 | 8 | 2.0 | 20.0 | 26 |

The bridged, water-soluble copolymers prepared according to Examples 1 to 5 (the acidic copolymer solutions obtained in process step (D) in each case) and the copolymer solutions obtained according to process step B of the Examples were tested as wet-strength agents in papermaking. The stock consisted of 50% of bleached soft wood sulfite pulp and 50% of bleached beech sulfite pulp. The stock consistency was 0.5%. The copolymers tested were each used in an amount of 1% by weight, based on dry fiber. The copolymers acted on the stock for 10 minutes. The stock was drained on a Rapid-Köthen sheet former to give paper sheets having a basis weight of 80 g/m². The sheets were dried for 6 minutes at 90° C. and the wet breaking length was measured. To determine the wet breaking length, 1.5 cm wide paper strips were stored in water for 30 sec, and the breaking length was determined for moist paper strips using the apparatus described in DIN 51,221, Part 1. The results are shown in Table 2.

TABLE 2

| Example No. | Comparative Example | Copolymer | $L_N^{(1)}$ (m) | $L_N^{(2)}$ (m) | $L_N^{(3)}$ (m) | $L_N^{(4)}$ (m) |
|---|---|---|---|---|---|---|
| 1 | 1 | 1 (B) | 681 | 619 | 514 | 490 |
|   |   | 1 (D) | 850 | 798 | 678 | 711 |
|   | 2 | 2 (B) | 353 | 342 | 233 | 278 |
|   | 3 | 3 (B) | 390 | 389 | 269 | 294 |

TABLE 2-continued

| Example No. | Comparative Example | Copolymer | $L_N^{(1)}$ (m) | $L_N^{(2)}$ (m) | $L_N^{(3)}$ (m) | $L_N^{(4)}$ (m) |
|---|---|---|---|---|---|---|
|   | 4 | 5 (B) | 480 | 420 | 320 | 310 |
| 2 |   | 2 (D) | 597 | 571 | 480 | 465 |
| 3 |   | 3 (D) | 508 | 564 | 448 | 458 |
| 4 |   | 4 (D) | 619 | 588 | 508 | 464 |
| 5 |   | 5 (D) | 1003 | 539 | 846 | 868 |

(1)Wet breaking length without aging (storage in water for 30 sec)
(2)Wet breaking length with aging (storage in water for 30 sec, 5 min at 130° C.)
(3)Wet breaking length without aging (storage in water for 15 min)
(4)Wet breaking length with aging (storage in water for 15 min, 5 min at 130° C.).

We claim:

1. A water-soluble copolymer having an improved shelf-life, which is produced by:
   (A) copolymerizing a monomer mixture of:
   (a) from 50 to 99 mol % of acrylamide or methacrylamide or a mixture thereof;
   (b) from 50 to 1 mol % of a monoethylenically unsaturated monomer containing acetal groups having the formula:

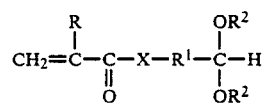

wherein R is —H, —CH₃, —C₂H₅; X is —O— or —NH—: R¹ is C₁-C₈-alkylene or arylene and R² is C₁-C₄-alkyl or both radicals R² form a C₂-C₄-alkylene group;
   (c) from 0 to 20 mol % of one or more monomers which are copolymerizable with (a) and (b), but which differ therefrom;
   The sum of the mol percentages (a), (b) and (c) being 100, in the presence of a polymerization initiator under conditions such that the acetal groups of monomer (b) undergo virtually no hydrolysis, to produce a copolymer having a K value of from 10 to 70;

(B) hydrolyzing the acetal groups of monomer (b), present as copolymerized units in copolymer (A) to aldehyde groups at a pH below 5;

(C) self-condensing copolymer (B), containing aldehyde groups at a pH of above 5 to at most a pH such that the resulting condensates remain water-soluble, by reacting acrylamide groups of a chain of the copolymer with aldehyde groups of another chain of the copolymer; and (D) stopping the reaction of step (C) by adding acid until the pH becomes 3 or less.

2. The water-soluble copolymer of claim 1, wherein in copolymerizing said monomer mixture, from 70 to 90 mol % of acrylamide or methacrylamide or a mixture thereof is used, and from 25 to 5 mol % of a monethylenically unsaturated monomer (b) is used.

3. The water-soluble copolymer of claim 1, wherein said one or more monomers (c), which are copolymerizable with (a) and (b), are selected from the group consisting of a compound of the formula:

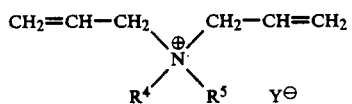

wherein $R^4$ and $R^5$ are each $C_1$-$C_{10}$-alkyl and Y is —Cl, —Br, methosulfate and ethosulfate, and a compound of the formula:

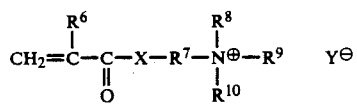

wherein $R^6$ is —H, —$CH_3$ or —$C_2H_5$; X is —O— or —$NR_6$, $R_7$ is $C_1$-$C_6$-alkylene, $R^8$, $R^9$ and $R^{10}$ are each —H, $OCH_3$, —$C_2H_5$ or $(CH_2$—$CH_2$—$O)_n$—H; n is from 1 to 6 and Y is —Cl, —Br, —I, sulfate, methosulfate or ethosulfate.

4. The water-soluble copolymer of claim 1, wherein said monomer (b) is a compound of the formula:

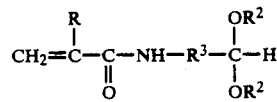

wherein R is —H, —$CH_3$ or —$C_2H_5$; $R^3$ is $C_2$-$C_4$-alkylene and $R^2$ is $C_1$-$C_4$ alkyl or both radicals $R^2$ form a $C_2$-$C_4$ alkylene group.

5. The water-soluble copolymer of claim 1, wherein said monomer (b) is a compound of the formula:

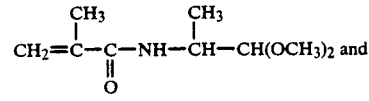

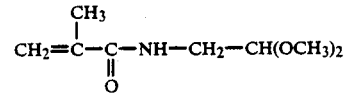

6. A process for the preparation of a water-soluble copolymer having an improved shelf-life and life, which comprises:

(A) copolymerizing a monomer mixture of:
(a) from 50 to 99 mol % of acrylamide or methacrylamide or a mixture thereof;
(b) from 50 to 1 mol % of a monoethylenically unsaturated monomer containing acetal groups having the formula:

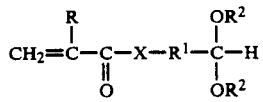

wherein R is —H, —$CH_3$, —$C_2H_5$; X is —O— or —NH—; $R^1$ is $C_1$-$C_8$-alkylene or arylene and $R^2$ is $C_1$-$C_4$-aklyl or both radicals $R^2$ form a $C_2$-$C_4$-alkylene group; and (c) from 0 to 20 mol % of one or more monomers which are copolymerizable with (a) and (b), but which differ therefrom; the sum of the mol percentages of (a), (b) and (c) being 100, in the presence of a polymerization initiator under conditions such that the acetal groups of monomers (b) undergo virtually no hydrolysis, to produce a copolymer having a K value of from 10 to 70;

(B) hydrolyzing the acetal groups of monomer (b), present as copolymerized units in copolymer (A) to aldehyde groups at a pH below 5;

(C) self-condensing copolymer (B), containing aldehyde groups at a pH of above 5 to at most a pH such that the resulting condensates remain water-soluble, by reacting acrylamide groups of a chain of the copolymer with aldehyde groups of another chain of the copolymer; and (D) stopping the reaction of step (C) by adding the acid until the pH becomes 3 or less.

7. The process of claim 6, wherein in copolymerizing said monomer mixture, from 70 to 90 mol % of acrylamide or methacrylamide or a mixture thereof is used, and from 25 to 5 mol % of a monethylenically unsaturated monomer.

8. The process of claim 6, wherein said one or more monomers (c), which are copolymerizable with (a) and (b), are selected from the group consisting of a compound of the formula:

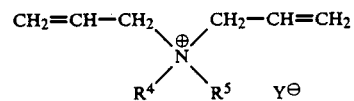

wherein $R^4$ and $R^5$ are each $C_1$-$C_{10}$-alkyl and Y is —Cl, —Br, methosulfate and ethosulfate, and a compound of the formula:

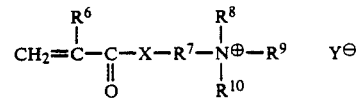

wherein $R^6$ is —H, —$CH_3$ or —$C_2H_5$; X is —O— or —$NR_6$, $R_7$ is $C_1$-$C_6$-alkylene, $R^8$, $R^9$ and $R^{10}$ are each —H, —$OCH_3$, —$C_2H_5$ or $(CH_2$—$CH_2$—$O)_n$—H; n is from 1 to 6 and y is —Cl, —Br, —I, sulfate, methosulfate or ethosulfate.

9. The process of claim 6, wherein said monomer (b) is a compound of the formula:
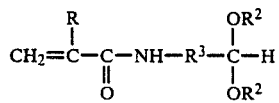
wherein R is —H, —CH₃ or —C₂H₅; R³ is C₂–C₄-alkylene and R² is C₁–C₄ alkyl or both radicals R² form a C₂–C₄ alkylene group.
10. The process of claim 6, wherein said monomer (b) is a compound of the formula:
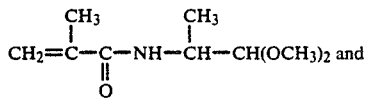
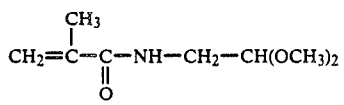
* * * * *